Patented Apr. 3, 1951

2,547,042

UNITED STATES PATENT OFFICE

2,547,042

COATED MINERAL GRANULE, METHOD OF MAKING SAME, AND ROOFING MATERIAL SURFACED THEREWITH

Gordon R. Pole, White Bear Township, Ramsey County, Minn., assignor to Minnesota Mining & Manufacturing Company, St. Paul, Minn., a corporation of Delaware No Drawing. Application December 26, 1947, Serial No. 794,085

15 Claims. (Cl. 117—65)

This invention relates in general to granular material of a siliceous nature, and more particularly it relates to an improved process for coating such granular or comminuted material, the product resulting therefrom, and a roofing or other product in which the coated granular material may be incorporated. While the coated granules of this invention are described and illustrated herein largely in connection with mineral or weather-resistant coverings for roofing sheets, it is to be understood that my invention defines a wide field of utility for other uses, e. g. including weather proofing, decorative purposes and other analogous or related uses.

The coated granules or particles of this invention may be employed as the coating on the surface of a roofing shingle or of asbestos-cement siding, or as a colored aggregate, as a facing material for cast stone, concrete or like building materials. For the base granule which is to be coated, I may employ natural or artificial siliceous mineral substances containing at least small proportions of free silica or of reactive silicates; such substances, for example, as quartz, quartzite, greystone, novaculite and phosphate furnace and other siliceous slags.

Methods have long been known for the artificial coloring of roofing granules, consisting of crushed and screened minerals, in which the granules are coated with a suitable pigment in an inorganic bond. Preferably, this bond is water-insoluble and is highly adherent to the base granule. Considerable commercial success has been achieved with certain processes in which the granules are mixed with a pigment and a soluble silicate solution until a thorough coating of the granules is obtained and the soluble silicate is then insolubilized by heat treatment, e. g. roasting temperatures, by chemical action, or by a combination of chemical action and heat treatment. Some of these processes are not entirely satisfactory by reason of the high temperatures required which preclude the use of certain pigments. One object of this invention, therefore, is the coating of granules at low temperatures, thus affording certain advantages over the high temperature processes, not only in respect to lower fuel costs but also in widening the choice of pigments that may be used and in permitting the employment of certain pigments, such as organic pigments, which are deleteriously affected at high temperatures. For example, the improved process is of considerable utility in the production of buff colored granules in which a yellow hydrated iron oxide is customarily employed as the pigment. In coating processes employing this pigment the temperature must be kept below approximately 500° F., otherwise its color will be destroyed by being changed from yellow to pink or red. Thus one object of this invention is to produce a relatively inexpensive colored granule having buff, white and pastel colored coatings, formed at relatively low temperatures and that do not require the inclusion of expensive opacifying agents such as titanium, zinc, barium, zirconium or tin compounds, as is customary when dark-colored base granules are employed.

A particular object of this invention is the production of durable, colored, weather-resistant coatings of complex silicates of alkaline earths on various silica containing mineral particles. I have found that this highly desirable result may be obtained by employing a hydro-thermal process to coat the mineral granules.

In accordance with the invention, artificially colored granules may be produced having a high color intensity and a wide variety of shades. The colored coatings are substantially water-insoluble and are firmly bonded to the base granule. The colored granules retain their attractive appearance under severe weathering conditions. The fluid coating compositions employed in making the improved artificially colored granules may be applied to the base granules under quite widely varying conditions without premature thickening or loss of film-forming properties of the pigment-containing composition. By reason of the relatively low temperatures employed in coating the granules, various heat sensitive pigments, such as yellow hydrated iron oxide, phthalocyanines and other organic pigments, may be employed in the production of artificially colored roofing granules according to this invention.

These several advantages, both in the process and in the resulting product are obtained by coating silica-containing mineral particles with a film of hydrated lime and a pigment and then subjecting the particles to steam treatment under pressures ranging from 15–300 pounds, gage, per square inch. It is believed that this treatment produces a chemical reaction between the lime coating and the siliceous surface of the particle and forms a complex calcium silicate coating on the surface of the mineral particles that is firmly bonded thereto, and is hard, opaque, water-insoluble and resistant to weathering agents.

It is further believed that part of the reaction that takes place results in the formation of hydrated dicalcium silicate as indicated in the equation:

$$2Ca(OH)_2 + SiO_2 \rightarrow 2CaO \cdot SiO_2 \cdot H_2O + H_2O$$

It is quite likely that other complex calcium silicates, such as hydrated monocalcium silicate, are also formed.

For example, granules of a siliceous material, such as quartz, quartzite, phosphate furnace and other siliceous slags, novaculite or greystone (a cryptocrystalline quartzite rock containing appreciable amounts of soda feldspar) are coated with hydrated lime by first wetting the granules with a small amount of water and then adding freshly hydrated lime and a pigment. The pigment may comprise iron oxide, chrome oxide, ultramarine blue, phthalocyanine or hydrated yellow iron oxide and may be employed in amounts varying from 2–20 pounds of pigment per ton of granules. Hydrated lime may be employed in amounts ranging from 10–100 pounds per ton of granules, and preferably about 60–80 pounds per ton of granules is used. The coating mixture of calcium hydrate and pigment is thoroughly dispersed over the surface of the siliceous granules in an evenly distributed coating by agitating the granules and coating in a suitable mixer, such as a tumbling-barrel or rotary pan type of mixer, for several minutes. The water content is regulated to provide a moderately dry coating that has free flowing properties. If too much water is employed in the coating, the coated granules may be dried in an oven or rotary drier, to provide the desired free flowing consistency and to avoid agglomeration of the granules.

The coated granules are then placed in an autoclave, out of contact with the water contained in the bottom of the autoclave, and are subjected to a steam pressure of from 15–300 pounds, gage, per square inch for a period of one to twelve hours. The time of reaction between the silica content of the granules and the lime is believed to be controlled by a time-temperature relationship. Thus at higher temperatures such as when a steam pressure of 150–200 pounds, gage, per square inch is employed with corresponding steam temperatures at 366°–388° F. the time of reaction is relatively short, for example, about three hours, while at lower steam pressures of from 15–50 pounds, gage, and corresponding temperatures of approximately 250°–298° F., a longer time is required for completion of the desired reaction. If sufficient moisture is employed, super-heated steam within certain temperature limits, of not more than approximately 450° F., may also be used to shorten the time of reaction. However, the use of super-heated steam is not particularly recommended since it does not appear to improve the product, it is costly to produce and requires the addition of sufficient water to carry out the reaction. It is also to be understood that the reaction may be carried out with steam at atmospheric pressures. This practice likewise is not recommended since the desired reaction is then quite slow and may require several days.

The reaction does not bond the individual granules together, although sometimes a loosely adhering, friable cake of granules is formed which may be easily broken up when the granules are removed from the autoclave. If desired, the coated granules may be washed to remove any loose lime, before or after removal from the autoclave, and then dried in an oven or other drying device.

Satisfactory hydrothermal coatings on the siliceous mineral granules have also been obtained by employing hydrated dolomitic types of lime or quick limes in place of the preferred high calcium limes. If quick limes are employed they may be hydrated during the step of applying the coating mixture to the granules. The best results have been obtained in most cases with fairly pure calcium limes that have been freshly hydrated.

Likewise it has been found that the coatings may be improved somewhat, in respect to improving the bond with the granule and the density of the coating, by adding certain mineralizers to the lime. The mineralizers accelerate and enter into the reaction between the lime and the silica content of the granule. The alkali metal fluoborates, alkali metal fluosilicates, magnesium fluosilicate, barium fluosilicate, aluminum fluosilicate, zinc fluosilicate, magnesium fluoride, cryolite and sodium aluminate have been found to be satisfactory for this purpose and may be added to the coating mixture in amounts of approximately 1–10 pounds per ton of granules. Sodium aluminate is particularly effective as a mineralizing agent when quick lime is employed as the principal coating ingredient.

Small amounts of finely divided silica such as quartz diatomaceous silica, pumice, silica gel, monocalcium silicate, pyrophyllite, bentonite, clay and Portland cement in quantities of 1–40 pounds per ton of granules may be added to the coating mixture to improve somewhat the density and durability of the hydrothermal coating. These materials appear to react with and to replace part of the calcium hydrate.

In preparing artificially colored roofing granules in accordance with the invention, the siliceous mineral is first crushed and screened to the desired size of approximately 10–35 mesh size (e. g. so as to pass a "10-mesh" screen and be retained on a "35-mesh" screen).

The following preferred formulas have been satisfactorily employed for the production of hydrothermally coated roofing granules, and illustrates several suitable coating compositions within the scope of my invention.

*Formula I*

| | Pounds |
|---|---|
| Siliceous granules (such as greystone, etc.) | 2000 |
| Hydrated lime (high calcium) | 60 |
| Yellow iron oxide (hydrated) | 8 |
| Red iron oxide | 0.2 |
| Sodium fluosilicate | 4 |
| Water | 60 |

The granules, crushed and screened to the desired size, are first moistened with water and then a slurry of the hydrated lime, yellow iron oxide, red iron oxide and sodium fluosilicate is added to the moistened granules. The granules and the coating mixture are agitated in a suitable mixer, such as a tumbling-barrel type of mixer, until the granules are completely coated. The coated granules may then be dried in the mixer by subjecting them to a blast of warm air or they may be dried in auxiliary drying equipment. After the coating on the granules is dried to a free-floating consistency, the granules are charged into an autoclave, out of contact with the water in the bottom portion of the autoclave. The granules are then subjected to a steam pressure of 150 pounds, gage, per square inch (366° F.) for a period of approximately 4 hours. As a result of this treatment an insoluble and weather-resistant coating of complex calcium silicate is formed on each of the granules, apparently by a reaction between the lime and the siliceous surface of the granules aided by the sodium fluosilicate mineralizing agent. The granules may then be air-dried or dried by other suitable means. If the granule coatings contain excess amounts of free lime, the granules are first washed with water and then dried. If the granules are to be used as the surfacing for roofing, they are then oiled for the purpose of increasing their adherence to asphalt in the presence of water; for this purpose the oil may contain a suitable wetting agent. A treatment adapted to produce the desired organophilic granule surface is disclosed in U. S. Patent No. 2,164,329 granted July 4, 1939 to Clifford L. Jewett.

*Formula 2*

| | Pounds |
|---|---|
| Siliceous granules (such as greystone, etc.) | 2000 |
| Hydrated lime (calcium hydrate) | 100 |
| Yellow iron oxide (hydrated) | 10 |
| Red iron oxide | 0.2 |
| Cryolite | 4 |
| Water | 72 |

The granule coating may be formed in accordance with the method described in connection with Formula 1. In this example the mineralizing agent is cryolite. The reaction forming the granule coating is carried out at a steam pressure of approximately 300 pounds, gage, per square inch (422° F.) for a period of approximately two hours. It is to be understood that the coating mixture of Formula 1 may likewise be reacted at the higher steam pressures, e. g. as described in this example. Likewise the coating mixture of Formula 2 may be reacted at lower steam pressures within the range described in which case the reaction requires a longer time for completion than the two hours described when high steam pressures and temperatures are used. The yellow iron oxide and red iron oxide are pigments and produce a buff-colored granule, as in Formula 1.

*Formula 3*

| | Pounds |
|---|---|
| Siliceous granules (such as greystone, etc.) | 2000 |
| Dolomitic quicklime (approx. 40.0% MgO, 56.3% CaO, 3% loss on ignition) | 70 |
| Silicon dioxide (silica flour minus 270 mesh) | 24 |
| Yellow iron oxide (hydrated) | 10 |
| Red iron oxide | 0.2 |
| Sodium aluminate (technical) | 8 |
| Water | 182 |

The granules are placed in a rotating drum mixer and moistened with a dolomitic lime slurry. After the slurry is well dispersed on the granules, a solution of sodium aluminate is added and the granules and coating mixture are agitated. The silica flour and pigment comprising yellow hydrated iron oxide and red iron oxide are added and the mixing continued until the granules are completely coated with the coating mixture. The coating is then dried, as by air, and the granules charged into a steam autoclave and subjected to a steam pressure of 118–120 pounds, gage, per square inch (350° F.) for a period of approximately 6 to 8 hours. Under steam pressure the lime, aided by the sodium aluminate mineralizer, apparently reacts with the siliceous surface of the granules and the silica flour in the mix to produce an insoluble, dense, hard, weather-resistant, buff-colored coating, believed to be a complex calcium silicate or possibly complex calcium-magnesium silicate.

*Formula 4*

| | Pounds |
|---|---|
| Siliceous granules (such as greystone, etc.) | 2000 |
| Hydrated lime (calcium hydrate) | 8 |
| Portland cement, white | 40 |
| Monocalcium silicate (hydrated) | 12 |
| Ultramarine blue pigment | 32 |
| Red iron oxide | 0.2 |
| Cryolite | 4 |
| Water | 68 |

This coating composition may be applied in accordance with the method described with Formula 1. Cryolite acts as a mineralizing agent and the Portland cement and monocalcium silicate acts as auxiliary reagents with the lime and the siliceous content of the granules. The reaction is carried out in an autoclave under steam pressure of 15–30 pounds, gage, per square inch (250°–274° F.) for a period of approximately three hours. Under this treatment, the lime and auxiliary materials together with the cryolite mineralizer, apparently react with the siliceous surface of the granule of produce an insoluble, hard, weather-resistant, blue coating of complex calcium silicate or possibly complex calcium aluminum silicate. When ultramarine blue pigment is employed, the reaction should be carried out at relatively low steam pressures not to exceed approximately fifty pounds, gage, per square inch. The low temperatures and pressures set forth in this example are preferred.

*Formula 5*

| | Pounds |
|---|---|
| Siliceous granules (such as greystone, etc.) | 2000 |
| Hydrated lime (calcium hydrate) | 100 |
| Pyrophyllite, North Carolina (minus 325 mesh) | 8 |
| Yellow iron oxide (hydrated) | 10 |
| Red iron oxide | 0.2 |
| Cryolite (synthetic) | 4 |
| Water | 60 |

This coating mixture may likewise be applied by following the method described in connection wtih Formula 1. The reaction may be carried out at a steam pressure of 118 pounds, gage, per square inch (349° F.) for a period of 6 hours.

*Formula 6*

| | Pounds |
|---|---|
| Siliceous granules (such as greystone, etc.) | 2000 |
| Calicum hydrate | 60 |
| Monocalcium silicate | 30 |
| Yellow iron oxide (hydrated) | 8 |
| Red iron oxide | 0.2 |
| Sodium aluminate | 8 |
| Colloidally dispersed silica solution, 18% | 100 |

In applying this coating composition the granules are first wetted with the colloidally dispersed silica solution. After thoroughly mixing the granules and silica solution, the calcium hydrate, monocalcium silicate, pigment and sodium aluminate are added and the mixing continued until the granules are completely coated with the mixture. The granules are then dried to a free-flowing condition and placed in a steam autoclave and subjected to a steam treatment of 150 pounds, gage, per square inch (366° F.) for a period of 4 hours.

Coating compositions of Formulas 1, 2, 3, 5 and 6 produce a buff-colored granule and the composition of Formula 4 a blue granule. Other pigments and coloring agents may be substituted for the pigments of the above formulas to produce granules of colors other than buff or blue; for example, red iron oxide may be employed if a red granule is desired, green phthalocyanine paste or chrome oxide may be employed if a green granule is desired, etc. Likewise the steam pressure set forth in connection with the various coating formulas may be modified within the preferred range of 15 pounds to 300 pounds, gage, per square inch, but it is to be understood that in carrying out the hydro-thermal reaction at the lower pressure range a longer period of reaction time will generally be required. It will be obvious that modifications in pigment content and the total amount and nature of the coating composition may be made within the limits set forth depending on the total surface area, desired color, and reactivity of the substituted ingredients. Likewise the mineralizing agent set forth in all of the foregoing formulas may be omitted. In this case the time of reaction will usually be longer than in reactions employing a mineralizer and in general the coating obtained without the mineralizer is not of as high quality in respect to density and its bond to the base granule.

Artificially colored roofing granules produced in the manner described when coated on a plastic stratum such as asphalt, in the manufacture of bituminous roofing, have been found to provide a permanently adherent surfacing for the roofing. Artificially colored granules of my invention may be used for other purposes, for examples, as the coating on the surface of an asbestos-cement siding, as a colored aggregate, as a facing material for cast stone, concrete or like building materials or for other weather-proofing or decorative purposes.

What I claim is:

1. As a new article of manufacture, a crystalline siliceous base granule having on the exterior thereof a substantially non-blooming, water-insoluble coating, said coating consisting essentially of the hydro-thermal reaction product of an alkaline earth hydrate of the group consisting of calcium and magnesium and the reactive silica on the surface of the granule, said reaction product being produced at temperatures below 500° F. and under steam pressures of 15-300 pounds, gage, per square inch.

2. Artificially colored roofing granules of a siliceous base material having well bonded, substantially water-insoluble, colored surface coating comprising a coloring agent and an inorganic bond, said bond consisting essentially of a complex calcium silicate formed by reacting 10-100 pounds of hydrated lime per ton of granules with the surfaces silica content of said granules under steam pressures in the range of 15-300 pounds, gage, per square inch.

3. As a new article of manufacture, a siliceous base granule having on the exterior thereof a substantially water-insoluble coating, said coating consisting essentially of the hydrothermal reaction product of an alkaline earth hydrate of the group consisting of calcium and magnesium, a mineralizing agent and reactive silica on the surface of the granule, said mineralizing agent being present in amounts of approximately 12% or less of the alkaline earth.

4. Artificially colored granules comprising a siliceous mineral base coated with a substantially water-insoluble in situ formed coating, said coating consisting essentially of a pigment and a complex calcium silicate formed by the hydro-thermal reaction of hydrated quick lime and the surface silica content of said mineral base at temperatures below 500° F. and steam pressures in the range of 15-300 pounds, gage, per square inch.

5. Artificially colored roofing granules of a mineral base having a well bonded, substantially water-insoluble colored surface coating comprising a pigment and an inorganic bond, said bond consisting essentially of a complex calcium silicate formed by reacting 10 to 100 pounds of hydrated lime per ton of granules with lesser amounts of finely divided silica under steam temperatures within the range of 250° to 422° F. and at pressures of 15-300 pounds, gage, per square inch.

6. As a new article of manufacture, a siliceous base granule having on the exterior thereof a substantially water-insoluble coating, said coating consisting essentially of the hydrothermal reaction product of lime, a mineralizing agent in amounts of not greater than 12% of the lime content finely divided silica and reactive silica on the surface of the granule, said hydro-thermal reaction being carried out at steam pressures within the range of 15-300 pounds, gage, per square inch.

7. Artificially colored granules comprising a siliceous mineral base coated with a substantially water-insoluble, in situ formed coating, said coating consisting essentially of a pigment and a complex calcium silicate formed by the hydro-thermal reaction of hydrated lime, the free silica content of said base mineral and a mineralizing agent in amounts not substantially in excess of 10 pounds per ton of granules, said hydro-thermal reaction being carried out at steam pressures within the range of 15-300 pounds, gage, per square inch.

8. A roofing or building sheet material comprising a fibrous backing and a bituminous adhesive material having a weather-resistant coating of colored granules of the character defined in claim 2.

9. A composite sheet body for roofing and siding comprising a plastic stratum and an adherent surfacing for the same consisting of granules as defined in claim 3.

10. Artificially colored granules comprising a mineral base having minor proportions of free silica and coated with a substantially water-insoluble coating, said coating consisting essentially of a coloring agent and a complex calcium silicate formed by the hydro-thermal reaction of calcium hydroxide, cryolite and free silica on the surface of said base material, said cryolite being present in amounts not substantially in excess of ten pounds per ton of granules, said hydro-thermal reaction being carried out at steam pressures within the range of 15-300 pounds, gage, per square inch.

11. Artificially colored roofing granules of a mineral base material including minor proportions of reactive silica and having on the exterior thereof a well bonded, substantially water-insoluble coating, said coating consisting essentially of the hydro-thermal reaction product of dolomitic quick lime, sodium aluminate in amounts not in excess of 12% of the amount of quick lime and reactive silica on the surface of said base material, the reaction being carried out at steam pressures within the range of 15–300 pounds, gage, per square inch.

12. The method of coating siliceous granules which consists essentially of coating the granules with hydrated lime and reacting the lime with the surface silica content of the granules in the presence of minor proportions of a mineralizing agent under a steam pressure within the range of 15 to 300 pounds, gage, per square inch.

13. The method of applying a colored coating to mineral granules having minor proportions of free silica distributed therethrough, in the manufacture of roofing granules, comprising coating said granules with a film-forming composition consisting essentially of a coloring agent and hydrated lime, and hydro-thermally reacting the hydrated lime with the free silica on the surface of the granules at steam temperatures within the range of 250° to 422° F.

14. The method of applying a color coating to mineral granules composed, interalia, of small amounts of reactive silica which comprises applying to the exterior of the granules a mixture consisting essentially of a pigment, hydrated lime in amounts of the order of 40 to 100 pounds per ton of granules and lesser amounts of a mineralizing agent, mixing the granules and the coating composition until the coating composition is evenly dispersed on said granules, and then subjecting the coated granules to steam pressures within the range of 15 to 300 pounds, gage, per square inch for one to twelve hours.

15. The method of producing coatings on granular mineral material containing at least small amounts of reactive silica on the surface thereof which consists essentially of coating the granular material with a slurry of an alkaline earth hydrate of the group consisting of calcium and magnesium and a pigment and subjecting the coated granular material to steam pressures of 15–300 pounds, gage, per square inch to form a complex alkaline earth metal silicate on the surface of the granular material.

GORDON R. POLE.

REFERENCES CITED

The following references are of record in the file of this patent:

UNITED STATES PATENTS

| Number | Name | Date |
| --- | --- | --- |
| 1,582,318 | Van de Mark | Apr. 27, 1926 |
| 2,057,677 | Gundlach | Oct. 20, 1936 |
| 2,163,678 | Gundlach | June 27, 1939 |
| 2,192,284 | Dahlberg | Mar. 5, 1940 |
| 2,194,683 | Badollet | Mar. 26, 1940 |
| 2,439,650 | Cuno | Apr. 13, 1948 |